(12) United States Patent
Lee et al.

(10) Patent No.: US 8,350,893 B2
(45) Date of Patent: Jan. 8, 2013

(54) THREE-DIMENSIONAL IMAGING APPARATUS AND A METHOD OF GENERATING A THREE-DIMENSIONAL IMAGE OF AN OBJECT

(75) Inventors: Chao Hsu Lee, Singapore Science Park II (SG); Jin Xu, Singapore Science Park II (SG); Jian Zhang, Singapore Science Park II (JP)

(73) Assignee: Sony Corporation, Tokyo (JP)

( * ) Notice: Subject to any disclaimer, the term of this patent is extended or adjusted under 35 U.S.C. 154(b) by 215 days.

(21) Appl. No.: 12/952,836

(22) Filed: Nov. 23, 2010

(65) Prior Publication Data
US 2011/0141243 A1      Jun. 16, 2011

(30) Foreign Application Priority Data
Dec. 7, 2009   (SG) ................................ 200908204-1

(51) Int. Cl.
H04N 13/02          (2006.01)
(52) U.S. Cl. ............................................... 348/49
(58) Field of Classification Search .............. 348/49–50, 348/51, 54
See application file for complete search history.

(56) References Cited

U.S. PATENT DOCUMENTS

| | | | | |
|---|---|---|---|---|
| 4,893,183 A * | 1/1990 | Nayar | ............................ | 348/135 |
| 5,841,441 A * | 11/1998 | Smith | ............................ | 345/587 |
| 6,367,933 B1 | 4/2002 | Chen et al. | | |
| 6,491,400 B1 | 12/2002 | Chen et al. | | |
| 6,877,863 B2 | 4/2005 | Wood et al. | | |
| 7,237,907 B2 | 7/2007 | Li et al. | | |
| 7,548,324 B2 * | 6/2009 | Lee et al. | ........................ | 356/605 |
| 8,032,327 B2 * | 10/2011 | Hebert et al. | ................. | 702/153 |
| 8,111,239 B2 * | 2/2012 | Pryor et al. | .................... | 345/156 |
| 2002/0176163 A1 * | 11/2002 | Chikazawa | .................... | 359/463 |
| 2002/0186796 A1 * | 12/2002 | McFarland et al. | ........... | 375/341 |
| 2002/0186976 A1 | 12/2002 | Seo | | |
| 2006/0204125 A1 | 9/2006 | Kempf et al. | | |
| 2007/0248260 A1 | 10/2007 | Pockett | | |
| 2009/0009592 A1 * | 1/2009 | Takata et al. | .................... | 348/47 |
| 2009/0021714 A1 * | 1/2009 | Mann et al. | .................... | 355/67 |
| 2011/0292203 A1 * | 12/2011 | Kim | .............................. | 348/135 |

FOREIGN PATENT DOCUMENTS
EP                1333687        8/2003

OTHER PUBLICATIONS
Singapore Search Report dated May 16, 2012, issued in connection with counterpart SG Application No. 200908204-1.

* cited by examiner

Primary Examiner — Nhon Diep
(74) Attorney, Agent, or Firm — SNR Denton US LLP

(57) ABSTRACT

A three-dimensional imaging apparatus 101 for generating an image of a three-dimensional object 111 is disclosed. The 3D-imaging apparatus 101 has two sets 103a, 103b of reflective elements 105, an image-capturing device 107 and a processor. The image-capturing device 107 is for capturing two images using rays emitted from the object 111 and reflected from each of the two sets 103a, 103b of reflective elements 105. The processor is arranged to identify a plurality of sets of matching points in the respective captured images, each set of the matching points having been generated by the respective rays emitted by a single corresponding element of the object 111. For each set of the matching points identified in the respective captured images, the processor is arranged to determine a location of the corresponding element of the object 111. Thus, a three-dimensional image of the object 111 can be generated by the processor using the determined locations of a plurality of elements of the object 111. A method of generating a three-dimensional image of an object is also disclosed.

18 Claims, 16 Drawing Sheets

$\cos(b_n) = (r - r\cos(a_n) + d) / L$
$L = (r - r\cos(a_n) + d) / \cos(b_n)$
$v = L * \sin(k_n)$
Normalization Factor $= (e + v_1) / (e + v_2)$

THREE-DIMENSIONAL IMAGING APPARATUS AND A METHOD OF GENERATING A THREE-DIMENSIONAL IMAGE OF AN OBJECT

FIELD OF THIS INVENTION

This invention relates to a three-dimensional (3D) imaging apparatus and a method of generating a 3D image of an object.

BACKGROUND OF THE INVENTION

Multiple-perspective imaging has been used for reconstructing a 3D model of an object. Some examples of achieving multiple-perspective imaging include:

(i) setting up as many cameras as the number of multiple-perspective images required;

(ii) using two cameras to capture a pair of two-dimensional (2D) images from different perspectives, and relying on a software algorithm to determine the intermediate perspectives by interpolation, so that respective points of the 3D model are determined based on corresponding epipolar lines in the images captured by the two cameras. In other words, the image planes of the images are manipulated; and (iii) relying on cameras with built-in depth keys which provide depth information in each pixel of the captured images for reconstructing the 3D model.

Methods (i) and (iii) relies on sophisticated hardware. The advantage of method (i) is that the large amount of data captured makes it possible to obtain any perspective view which the user may require. However, the large number of cameras needed for method (i) means that it is technically and economically impracticable to set up and maintain such a system. Furthermore, the system is inefficient since large amounts of the captured data are redundant. This is because adjacent pairs of the cameras capture almost identical images of portions of the object near the zero-plane of the cameras in Cartesian space.

By contrast, method (ii) relies on sophisticated software instead of hardware. Although method (ii) only requires a pair of cameras and thus offers a more viable option than method (i) in respect of technicality and cost, the accuracy of the intermediate perspectives is typically compromised by factors like disorder (due to a feature of the object being seen by one camera and not the other), incorrect matching, and lack of information due to occlusion (there may be portions of the object which are not visible to either camera). Of the three methods above, this is least able to guarantee perfect images, and perfect interpolation is practically impossible in any circumstances. As for method (iii), the resolution and accuracy of the depth information provided in each pixel of the images captured using the depth cameras are inconsistent, and method (iii) too is susceptible to problems such as occlusion.

The present invention aims to provide a 3D-imaging apparatus and a method of forming a 3D image of an object, which at least ameliorate the problems described above, and also to provide the general public with both an alternative 3D-imaging apparatus and an alternative method of forming a 3D imaging of an object.

SUMMARY OF THE INVENTION

In general terms, this invention proposes a 3D-imaging apparatus having at least two sets of reflective elements, each arranged to reflect a light ray from a respective portion of the image towards an image-capturing device. The sets of reflective elements are arranged facing an object to be imaged, and the reflective elements are selected and/or positioned such that the image-capturing device captures images from each of the at least two sets of reflective elements during the operation of the 3D-imaging apparatus. By locating sets of matching points (or pairs of matching points in cases where there are two sets of reflective elements) in the captured images—that is, points which were produced using light emitted from the same element of the object—the position of that element can be identified. From a plurality of such elements, the outline of the object in 3D space can be determined.

Specifically, a first aspect of the invention proposes a 3D-imaging apparatus for generating an image of a 3D object. The 3D-imaging apparatus comprises: (i) at least two sets of reflective elements; (ii) an image-capturing device; and (iii) a processor for performing the calculation described above.

By providing at least two sets of reflective elements—each set having a plurality of reflective elements—corresponding reflective elements from the at least two sets reflect various perspective views of the object, which are then captured by the image-capturing device. Note that preferred embodiments of the method are performed without the sophisticated apparatus of method (i) explained above. Furthermore, unlike method (iii), it is not required to capture depth information at each perspective, thus saving bandwidth and reducing date storage requirements and subsequent data processing time.

Furthermore, the sets of reflective elements can be positioned so that collectively they cover a greater area than the lenses of the two cameras used in method (ii) (that is, they collectively subtend a greater range of angles around the object), so there is much less risk of disorder and occlusion.

The 3D-imaging apparatus may be operative to normalise the captured images to take into account possible distortions in the images caused by different distances which different ones of the rays travel between the object and the image capturing device. The normalisation may be done by resizing columns of one of the captured images so that their height is the same as the height of corresponding columns of the other respective image. This can be done using a reference baseline—that is a shape which is known and which approximates the shape of the three-dimensional object. Sampling points on the baseline are defined. Each sampling point is such that, if light rays were emitted from it in all directions, two such rays would be reflected from respective ones of the first and second sets of elements, to form corresponding points of the first and second images. These (hypothetical) rays therefore approximate the actual rays emitted by the object and which caused the generation of the images. Using the positions of the sampling points and the reflective properties of the reflective elements, it is possible to calculate the amount of distortion which would have occurred if the actual rays had been emitted at the sampling points, and the normalisation is performed to correct this distortion.

Normalisation of the captured images may be necessary for epipolar matching—in which an epipolar line in one of the captured images is compared against a corresponding epipolar line in the other respective image—to locate the plurality of matching points in the respective captured images. Consequently, corresponding pixels along respective rows of the captured images may have a common epipolar line.

Alternatively, the 3D-imaging apparatus may compare an epipolar line in one of the captured images against a plurality of epipolar lines in the other respective image. Consequently, pixels along respective rows in one of the captured images may be matched against pixels along a plurality of rows in the respective other of the captured images. Advantageously, this may improve the robustness of the epipolar matching by allowing some differences in the characteristics of the matched pixels. Such differences may be caused by excess deviation of the reference baseline from the object outline.

Further, the two sets of reflective elements may be arranged on a common surface, such as a common plane. The common surface may be parallel to the reference baseline. In this case, the 3D-imaging apparatus may reduce problems such as occlusion, since the object outline may cast rays on the respective reflective elements at an angle that is substantially normal to the reference baseline.

In some embodiments the first set of reflective elements are grouped together, spaced apart from the second set of reflective elements, which are also grouped together.

Alternatively, the at least two sets of reflective elements may be interleaved. This has the advantage that, compared to a case in which corresponding elements are significantly spaced apart, it is likely to increase the number of matching points, because there will be fewer points which are visible on one of the images but occluded in the other. Furthermore, such an embodiment allows a larger viewing angle of the object while allowing the at least two sets of reflective elements to be occupy the same physical space.

Optionally, each of the reflective elements may be a holographic optical element. As holographic optical elements are light-weight, they may be easily set up. Moreover, since the holographic optical elements may be configured to have different reflection angles, the fabrication of the 3D-imaging apparatus may have design flexibility.

A second aspect of the invention proposes a method of generating a 3D image of an object. The method comprises the steps of: (i) arranging at least two sets of reflective elements relative to the object; (ii) arranging an image-capturing device relative to the at least two sets of reflective elements; (iii) using the image-capturing device to capture an image reflected from each of the at least two sets of reflective elements; (iv) locating a plurality of sets of matching points in the respective captured images, each set of the matching points having been generated by rays emitted by a single corresponding element of the object; (v) using the plurality of sets of matching points to determine the location of a corresponding element of the object; and (vi) generating a 3D image of the object using the determined locations of the plurality of elements of the object.

BRIEF DESCRIPTION OF THE DRAWINGS

Embodiments of this invention will now be described, by way of examples only, with reference to the accompanying drawings, of which:

FIG. 2b illustrates a method of constructing the holographic optical element of FIG. 2a;

FIG. 14b illustrates a cross-section B-B' of the machined block of FIG. 14a.

DETAILED DESCRIPTION OF THE EMBODIMENTS

Figure 1A:
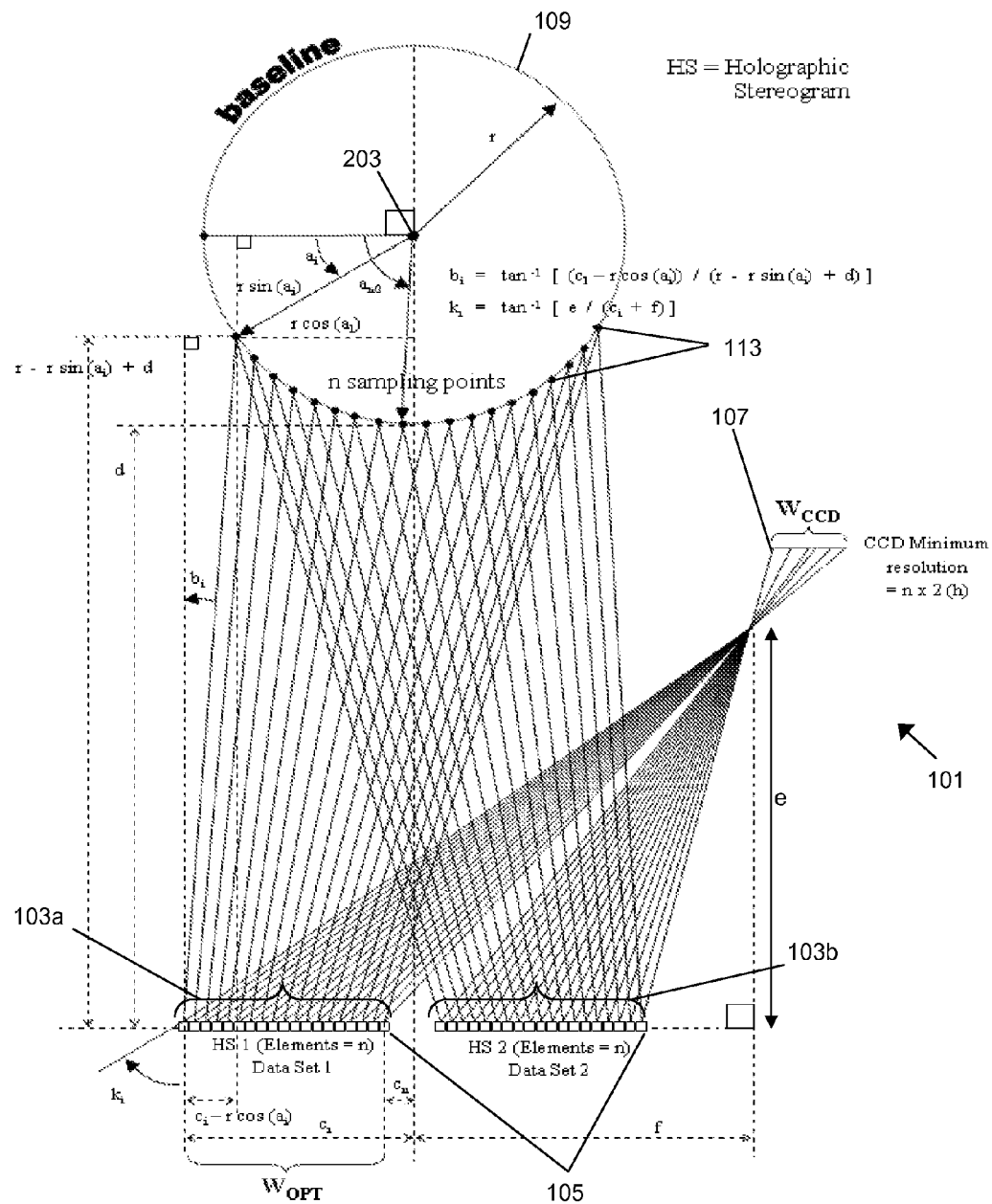
FIG. 1a illustrates an embodiment of the 3D-imaging apparatus having two sets of holographic optical elements and an image-capturing device, both arranged relative to a reference baseline derived based on an object outline in 3D space.

FIG. 1a illustrates an embodiment of the 3D-imaging apparatus 101, which is arranged to image an object 111 having a three-dimensional shape (i.e. the points on its surface do not all lie on a two-dimensional common plane). The imaging apparatus 101 has: (i) two two-dimensional ('2D') arrays 103a, 103b of reflective elements 105; (ii) an image-capturing device (shown in FIG. 1a as a charge-coupled device 107); and (iii) a processor (not shown). An example of the processor may be a Dell Dimension T7400 Workstation.

The arrays 103a, 103b are positioned to face towards the object 111 to be imaged. The shape of the object 111 is initially unknown, but it will be assumed in the following discussion that it approximates a portion of the surface of a circular cylinder having a radius denoted by "r" and a length direction which in FIG. 1a is the direction into the page. The cylinder is referred to as the "baseline" 109, and appears as a circle in FIG. 1a which is a cross-section of the cylinder. For example, if the object 111 is the body of a person, the baseline 109 could be a cylinder with an axis parallel to the height direction of the person. Note that in variations of this embodiment the baseline may have a different selected shape. For example, to take a photograph of a human head it may be better for the baseline to be an elliptic cylinder instead of a circular cylinder.

The user initially estimates a length direction of the object 111, derives the baseline 109, and positions the arrays 103a, 103b such that they lie in a common plane a distance d from the baseline 109. The common plane includes (i) the length direction of the object 111 (i.e. the direction into the page) and (ii) a second direction normal to the length direction of the object (i.e. the left-right direction in FIG. 1a). The arrays 103a, 103b are spaced apart in the second direction. The distance of the common plane from the centre line of the baseline 109 is d+r.

Figure 1B:
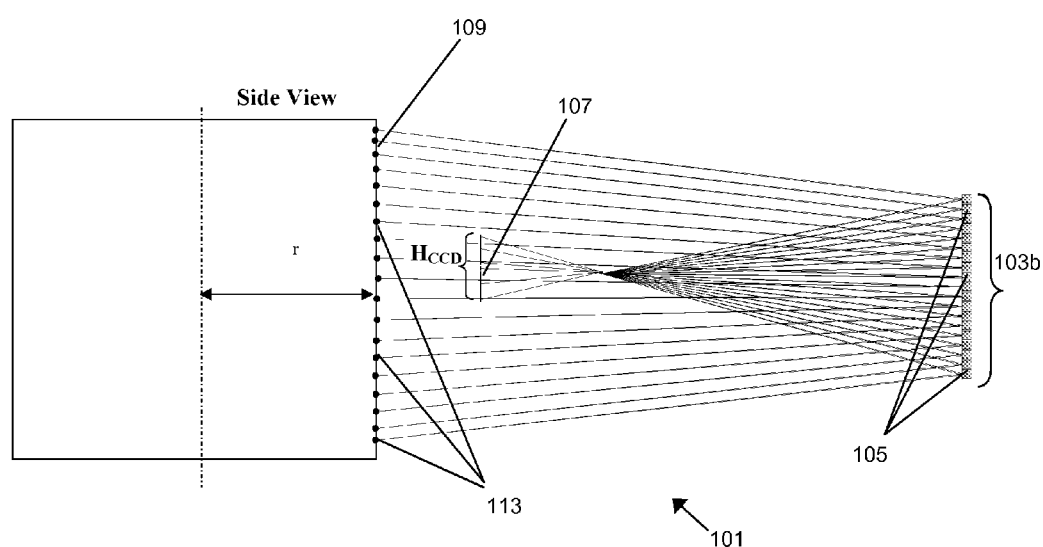
FIG. 1b illustrates the embodiment of FIG. 1 viewed from a transverse direction.

The arrays 103a, 103b each has a finite extension in the direction which is left-right in FIG. 1a, and also an extension in the direction which is parallel to the longitudinal axis of the direction into the page in FIG. 1a. That is, each of the arrays 103a, 103b is viewed "edge on" in FIG. 1a. FIG. 1b shows the same apparatus 101 looking in the direction which is left-right in FIG. 1a. In this view also, the arrays 103a, 103b are viewed edge-on.

As seen in FIGS. 1a and 1b, the reflective elements 105 have the general function of reflecting light received from the object 111, and directing it towards the charge-coupled device 107. How they perform this function is explained in more detail below. Each of the arrays 103a, 103b may be a two-dimensional rectangular array of reflective elements 105. That is, each array 103a, 103b may be considered either a set of columns of reflective elements 105, which each extends in the length direction of the object 111, or as a set of rows of reflective elements 105 which each extends in the left-right direction of FIG. 1. FIGS. 1a and 1b illustrate the case that in each of the arrays 103a, 103b, there are 19×19 reflective elements 105 extending in the length direction of the object 111 as well as in the left-right direction of FIG. 1a, but in other embodiments there may be other numbers of reflective elements 105. In any case, the number of columns of elements in each array is designated as "n" (e.g. n=19), and we use the index i=1, 2, . . . , n−1, n to label the n columns of reflective elements.

The charge-coupled device 107 is arranged relative to the two sets 103a, 103b of reflective elements 105 to capture virtual images of the object 111 as reflected by the reflective elements 105. The rays reflected by the elements 105 towards the charge-coupled device 107 converge at a perpendicular distance 'e' from the common plane of the reflective elements 105 and at an offset distance from the rightmost reflective element 105, as seen from FIG. 1a. The charge-coupled device 107 has sufficient resolution to capture all the rays of light.

The relative arrangement of the reflective elements 105, the charge-coupled device 107 and the cylindrical baseline 109 is measured by a level gauge (not shown). However, other measurement tools such as a laser measurement meter may also be used.

Figure 2A:
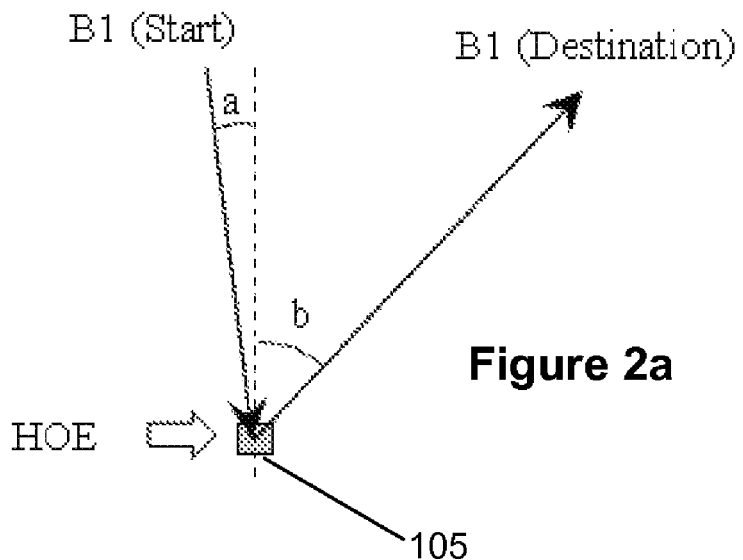
FIG. 2a illustrates the optical function performed by one of the holographic optical elements of FIG. 1.

In the first embodiment, the reflective elements 105 are holographic optical elements. Turning to FIG. 2a, the function performed by one of the holographic optical elements 105 is illustrated. The element 105 has a notional normal direction indicated by the dashed line. The holographic optical element 105 is capable of only one reflection: reflecting a ray incident on the element 105 which is incident on the element 105 in one predetermined direction (at an angle from the normal direction marked as "p") so as to produce an outgoing ray in another predetermined direction (at an angle from the normal direction marked as "q"). These two directions lie in the plane of the paper in FIG. 1a.

Reverting to FIG. 1a, let us consider pairs of corresponding optical elements 105 in the two arrays 103a, 103b having the same index i. For example, one such pair is the leftmost holographic optical elements 105 in the respective sets 103a, 103b for both of which i=1. For each pair of optical elements 105, there is a corresponding i-th sampling point 113 on the cylindrical baseline 109. For each of the pairs of optical elements, the corresponding sampling point 113 is in the direction relative to the optical element 105 which is denoted $b_i$ in FIG. 1a. Note that this angle is different for each of the pairs of optical elements 105. Specifically, the i-th sampling point 113 is the point on the baseline 109 such that, for each of the i-th holographic optical elements 105, angle $b_i$ is approximately equal to the corresponding angle marked as "p" in FIG. 2a. Hence, each of the holographic optical elements 105 from each of the sets 103a, 103b reflects a different ray of light into the charge-coupled device 107.

In other words, if two rays of light were emitted by the i-th sampling point 113 towards the respective i-th pair of optical elements, those rays would be reflected by the respective optical elements 105, and would be transmitted to the charge-coupled device 107 in the respective directions marked as "q" in FIG. 2a. Accordingly, the leftmost holographic optical element 105 in each set 103a, 103b reflects the ray emanating from the leftmost sampling point 113 towards the charge-coupled device 107; the second leftmost holographic optical element 105 in each set 103a, 103b reflects the ray emanating from the second leftmost sampling point 113 towards the charge-coupled device 107, and so forth. Note that the angles "p" and "q" are different for the i-th pair of optical elements, and are also different for different indices i. That is, if $p_{i,set1}/q_{i,set1}$ and $p_{i,set2}/q_{i,set2}$ represent the angles of incidence and reflection of the holographic optical elements 105 of the arrays 103a and 103b respectively, then $p_{i,set1}$ is different from $p_{i,set2}$, and likewise, $q_{i,set1}$ is different from $q_{i,set2}$. Also, respective values of $p_{i,set1}$ are different for different indices i, and similarly, respective values of $q_{i,set1}$ are also different for different indices i.

The angular position of the i-th sampling point on the baseline 109 is denoted $a_i$. The rays reflected by the respective i-th pair of holographic optical elements 105 are transmitted to the charge coupled device 107 at an angle denoted by $k_i$ which is different for each of the pairs of holographic optical elements, and which for each of those holographic optical elements is approximately equal to the corresponding value of 90°−h (where h is as denoted in FIG. 2a).

Thus, each column of the holographic optical elements 105 is responsible for the charge coupled device 107 receiving an image of a corresponding a strip of the object 111 which is approximately a straight line extending parallel to the axis of the baseline 109, and for each such strip of the object 111 the charge coupled device 107 will receive two different images from respective columns of the respective arrays 103a, 103b (not necessarily from optical elements 105 having the same value of i).

Accordingly, the resolution of the object 111 as reconstructed by the 3D-imaging apparatus 101 will depend on such factors as: (i) the number of reflective elements 105 in each set 103a, 103b for a certain reference baseline; and (ii) the coverage of the object 111 in 3D space for a certain number of reflective elements in each set 103a, 103b. For example, the 3D-imaging apparatus 101 may be configured to reconstruct an object outline within a specified angle range, so that the rays emanating from the reference baseline 109 represent the corresponding ray emanating from the object 111 at that specified angle range. This may ensure that the resolution of the object is not compromised by a limited number of reflective elements, for example.

Figure 2B:
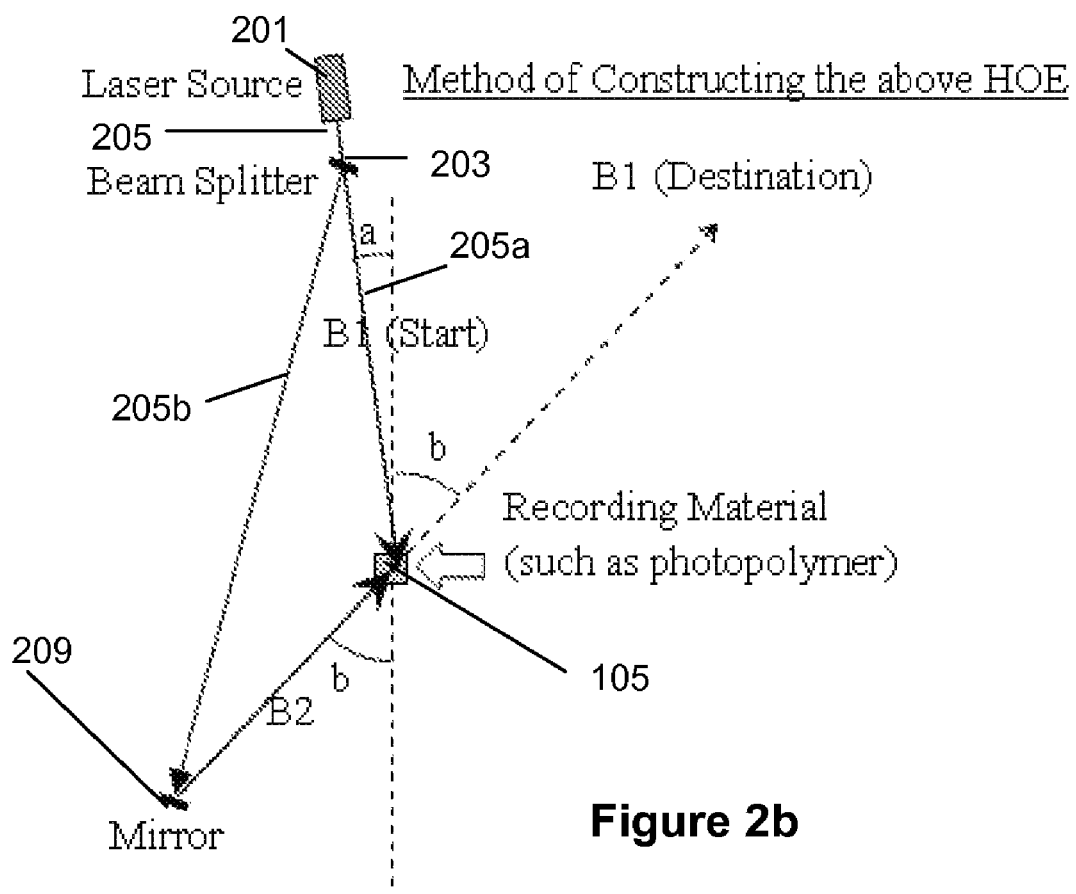

FIG. 2b shows how one of the holographic optical elements 105, made up of photopolymer material, is constructed using a laser source 201 or any coherent light source, after predetermining a desired angle of incidence p and a desired angle of reflection q. A beam splitter 203 splits a laser beam 205 from the laser source 201 into first and second laser sub-beams 205a, 205b. The first laser sub-beam 205a intersects the holographic optical element 105 at the desired angle of incidence p, while the second laser sub-beam 205b is reflected by a mirror 209 and intersects the holographic optical element 105 at the desired angle of reflection q. The reflection characteristics of the holographic optical element 105 can be changed during construction by varying the angle of the laser beam 205 in relation to the photopolymer material.

Figure 3:
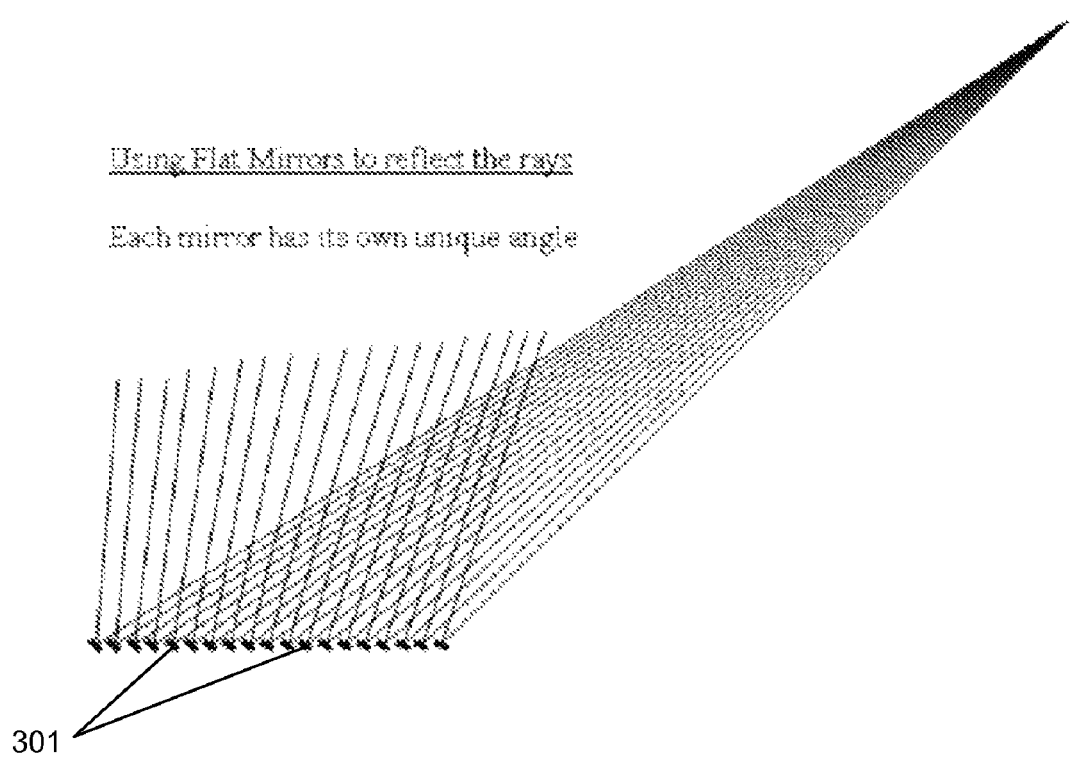
FIG. 3 illustrates an arrangement of mirrors used in place of the holographic optical elements of the 3D-imaging apparatus of FIG. 1.

Essentially, the holographic optical element 105 has the same reflection characteristics as a flat mirror plane that is titled at an angle to achieve the desired angle of incidence p and the angle of reflection q. Accordingly, any type of mirror-like reflective element can be used in place of the holographic optical elements 105. For example, FIG. 3 illustrates the arrangement of flat mirrors 301 as the reflective elements. In this case, each of the flat mirrors 301 would have to be individually positioned with its own respective tilt angle to achieve the correct reflection. Therefore, unique tilt angles of the flat mirrors 301 are visually apparent. By contrast, in the arrangement of FIG. 1a, the holographic optical elements 105 do not need to tilt.

Figure 4:
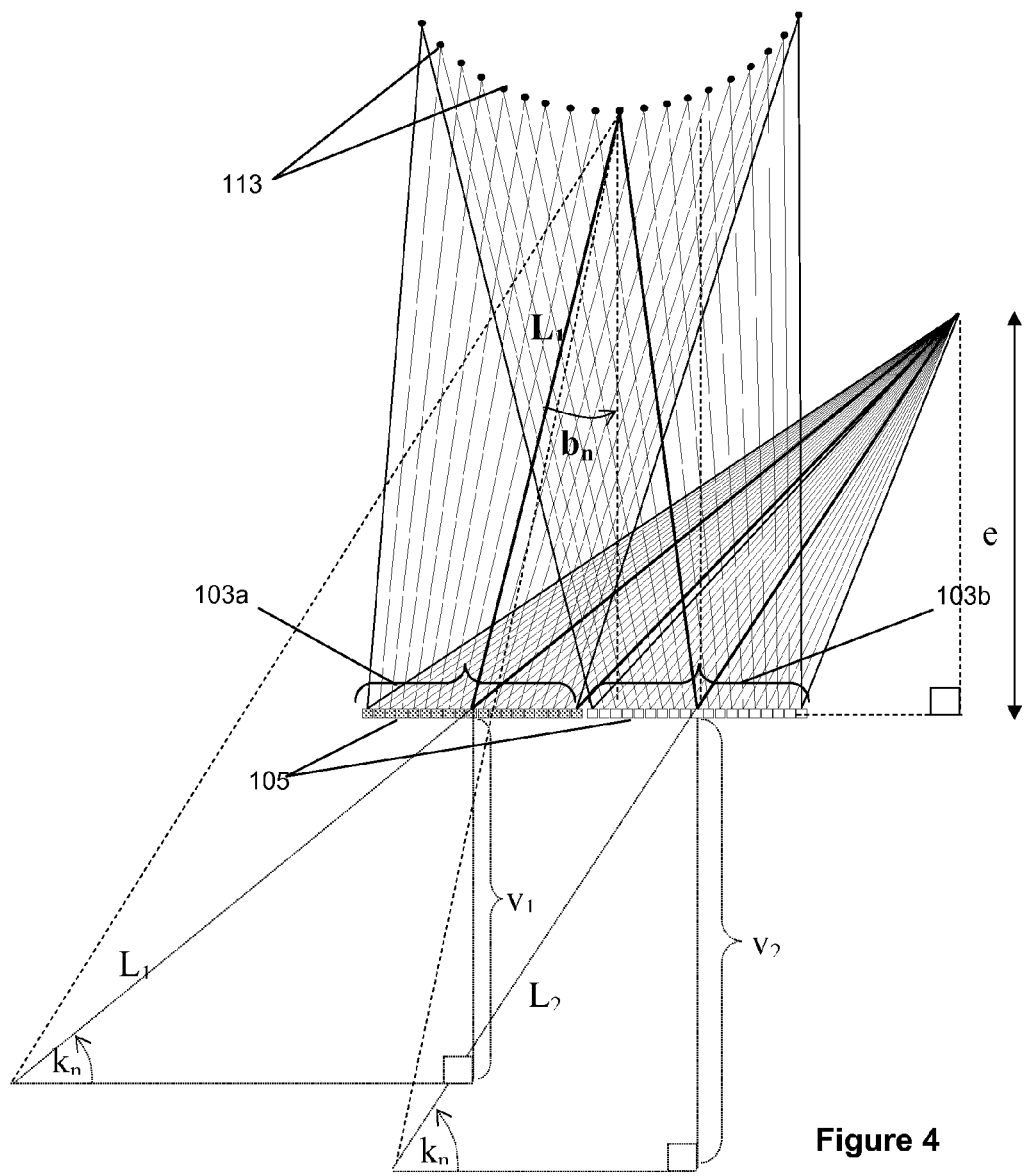
FIG. 4 is an enlarged view of a portion of the embodiment of FIG. 1, and illustrates a size difference between the respective data sets as reflected by corresponding holographic optical elements of the 3D-imaging apparatus of FIG. 1.

Since the angle of incidence $b_i$ and the angle of reflection $k_i$ between corresponding holographic optical elements 105 in each set 103a, 103b are different, this means that the virtual images (or data sets) captured by the charge-coupled device 107 have different sizes—see FIG. 4, which shows a portion of the embodiment of FIG. 1. Accordingly, the captured images have to be normalised before matching of captured data sets based on epipolar geometry takes place. Otherwise, epipolar lines between the captured data sets will not match.

Specifically, the captured data sets are normalised by resizing pixel columns of one of the data sets by a "normalisation factor", based on a ratio of the perpendicular distances—relative to the straight plane in which the holographic optical elements are arranged—between the charge-coupled device 107 and the corresponding pixels of the data sets. Since the relative arrangement of the holographic elements 105, the cylindrical baseline 113 and the charge-coupled device 107 is known, the normalisation factor can be derived by standard trigonometric calculations, as shown in FIG. 4.

Figure 5:
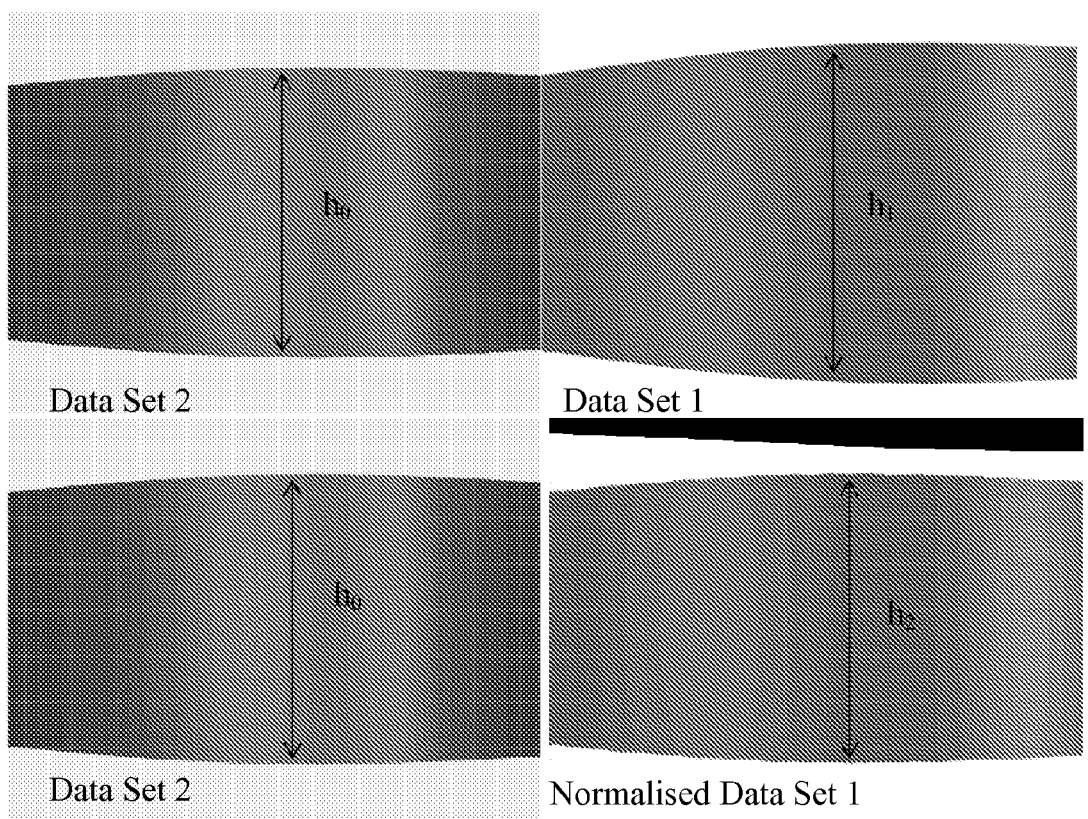
FIG. 5 illustrates the respective data sets captured by the 3D-imaging apparatus of FIG. 1 before and after normalisation.

In FIG. 5, the upper row shows the data sets captured by the image-capturing device 107 from the respective sets 103a, 103b of holographic optical elements 105. The upper row shows the two captured images: the left image ('data set 2') is captured from the right set 103b of holographic optical elements 105 as viewed from FIG. 1, whereas the right image ('data set 1') is captured from the left set 103a of holographic optical elements 105 as viewed from FIG. 1 also. It is seen from FIG. 5 that, due to the differences in the angle of incidence $b_i$ and the angle of reflection $k_i$ between corresponding holographic optical elements 105 in each set 103a, 103b, the columns of 'data set 1' are higher than the corresponding columns of 'data set 2'. Accordingly, 'data set 1' has to be normalised before the matching of the respective data sets based on epipolar geometry is possible. In particular, the normalisation of the data sets is performed by resizing each column of 'data set 1' by the normalisation factor mentioned above. The right image on the lower row in FIG. 5 shows the normalised 'data set 1'—in which each column of the normalised data set now has the same height as the corresponding column of 'data set 2'.

Figure 6A:
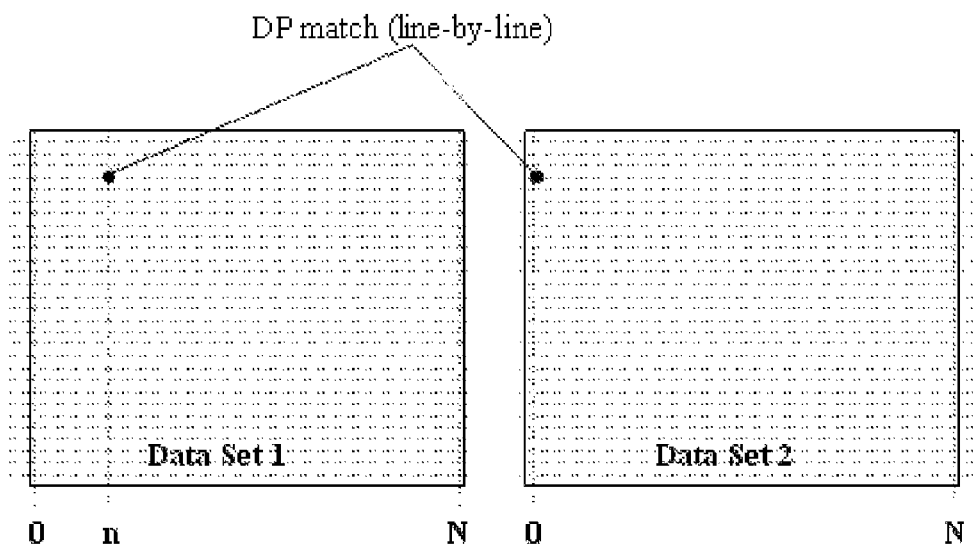
FIGS. 6a and 6b illustrate the matching of corresponding pixels in respective rows of the normalised data set of FIG. 5.
Figure 6B:
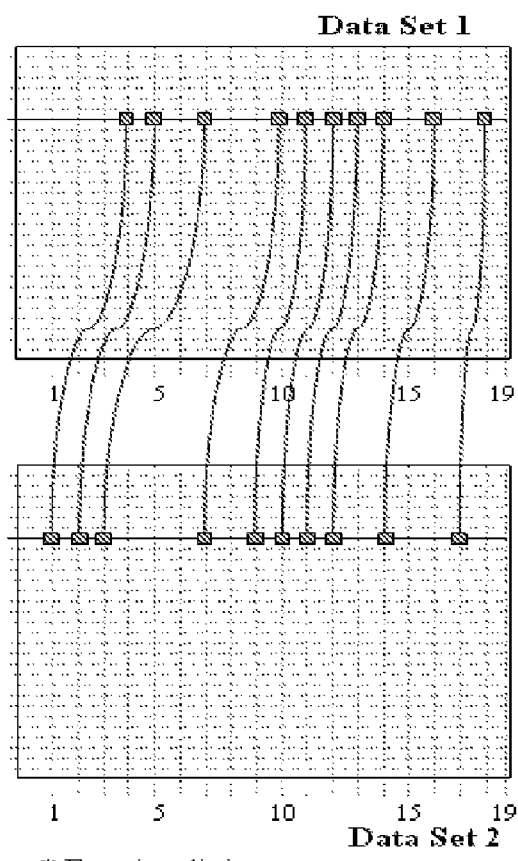

After the data sets are normalised, the processor is operable to locate matching columns in these data sets. This may be done by comparing an epipolar line in one of the data sets against a corresponding epipolar line in the other data set. More specifically, the processor derives the pairs of pixels respectively in the left and right images in the lower part of FIG. 5 which correspond to the same point on the object 111. Note that the two pixels which correspond to a given point on the object 111 will usually lie in the same row of the two images in the lower part of FIG. 5. This is illustrated in FIGS. 6a and 6b which shows how each pixel of the 7-th row of the left image (the image corresponding to data set 1) is matched with a corresponding pixel of the 7-th row of the right image (the image corresponding to data set 2). The pixel matching can be performed using any known match method such as dynamic programming, window-based, or graph-cut.

Alternatively, the matching of the data sets may be done by the processor by comparing an epipolar line in one of the data sets against a plurality of epipolar lines in the other data set. That is, each pixel in a given a particular row of one of the images may be matched against with a respective pixel from any of multiple rows in the other respective image captured. This may improve the robustness of the epipolar matching, since it accommodates some errors in epipolar constraints used during the pixel matching.

Figure 7:
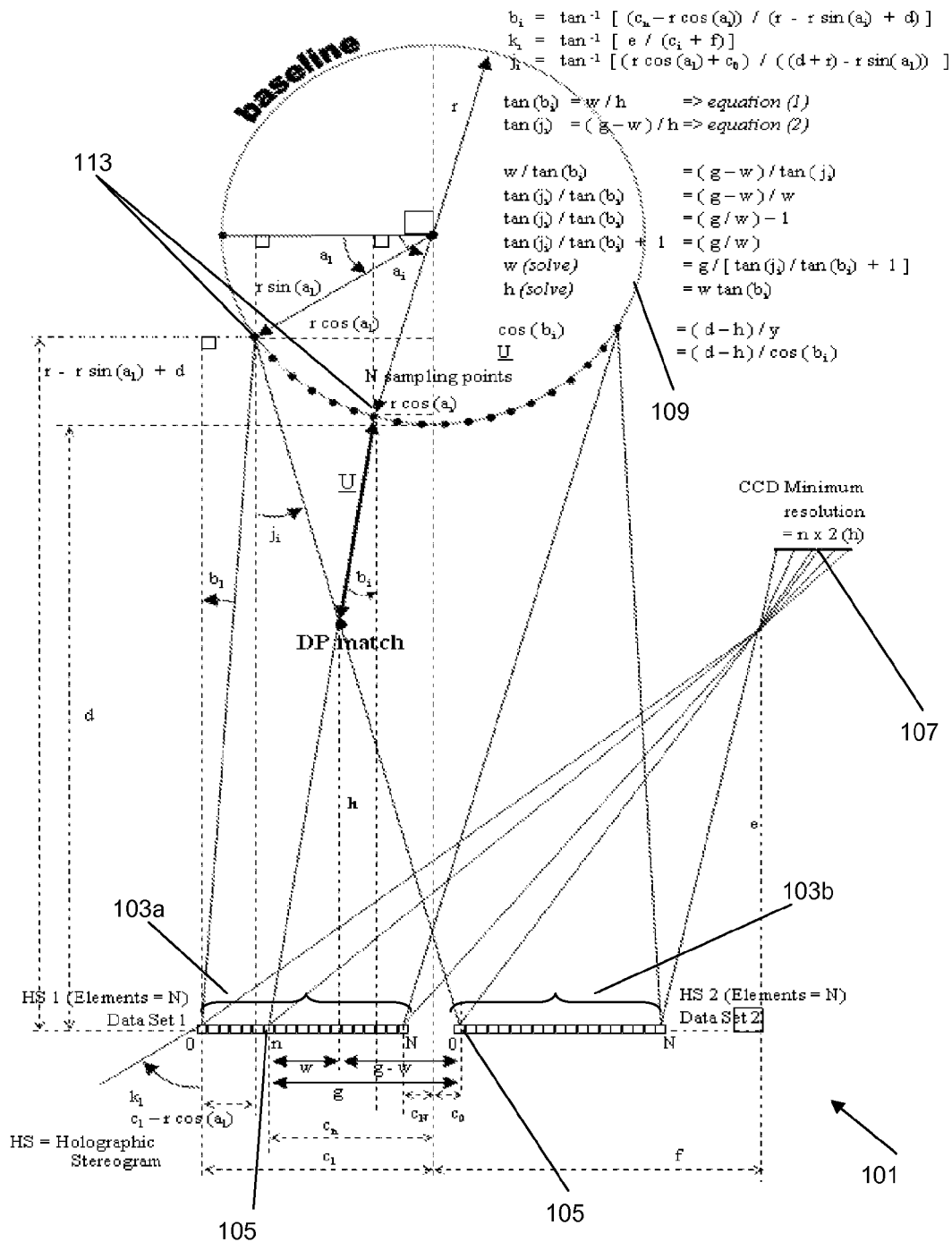
FIG. 7 illustrates a method of determining a point of the object outline.

Once the two matched pixels are determined, the corresponding rays are identified, as the interception point of these two rays is then found. This must lie on the surface of the object 111. FIG. 7 shows how an interception point labelled "DP match" is found at the intersection of the ray i=7 of the data set 1, and the ray i=1 of data set 2. By calculating backwards using the baseline 109, the three dimensional location of the interception point "DP match" can be found, as shown in FIG. 7. Repeating this process for successive matched pixels of the respective images, various points of the object outline 111 in the 3D space can be geometrically determined by the processor.

Figure 8:
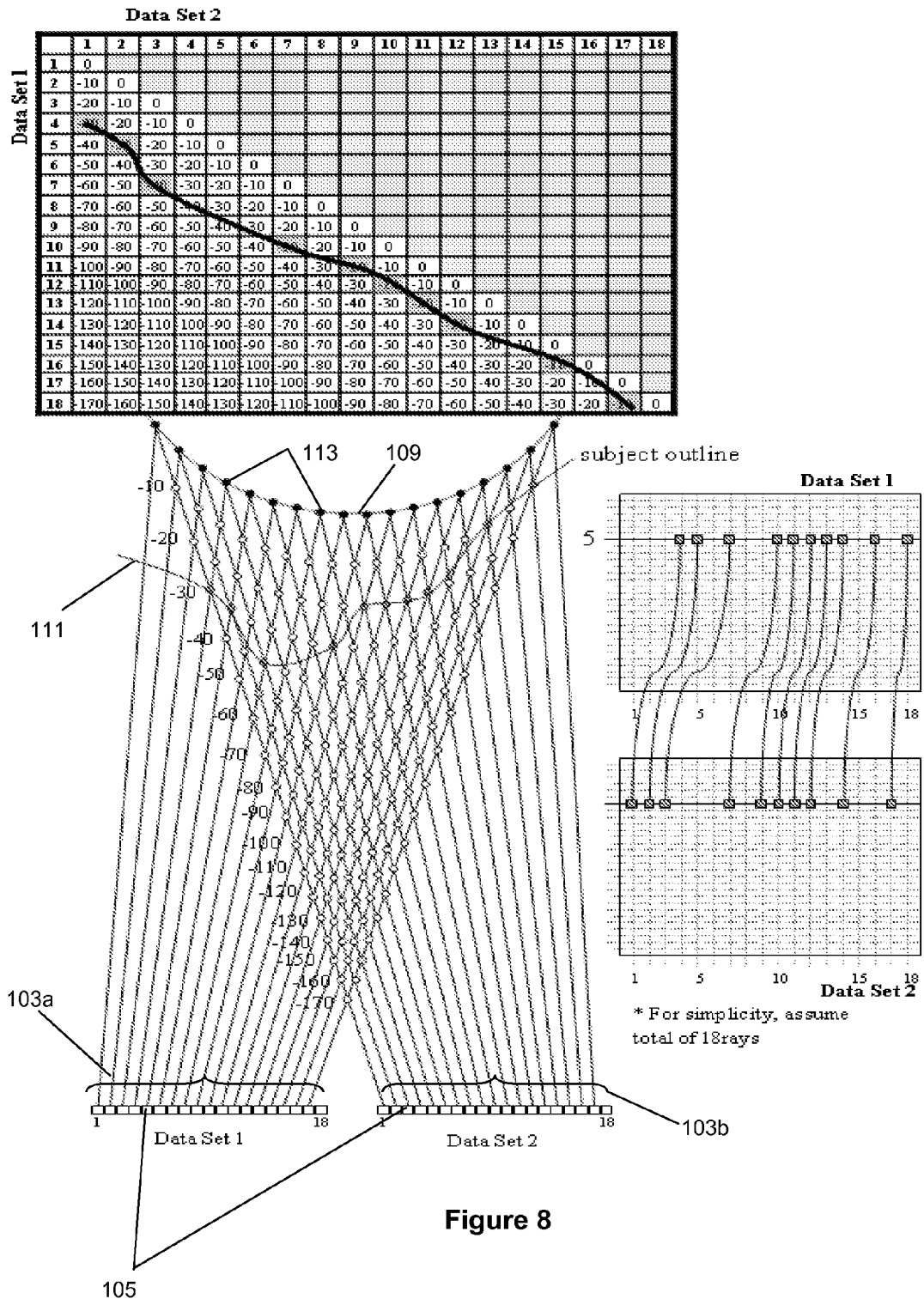
FIG. 8 illustrates a method of reconstructing the object outline.

FIG. 8 shows 10 pairs of pixels matched between the $5^{th}$ rows of the data sets. Accordingly, the processor will identify 10 intersection points of pairs of the rays, to determine 10 points of an outline of the object 111 in the 3D space relative to the cylindrical baseline 109. By connecting these 10 points of the outline of the object 111, a partial 3D image of the object 111 can be reconstructed by the 3D-imaging apparatus 101. By reconstructing different object outlines in relation to the corresponding rows of the data sets, a 3D image of the object 111 is accordingly reconstructed by the 3D-imaging apparatus 101.

Figure 9:
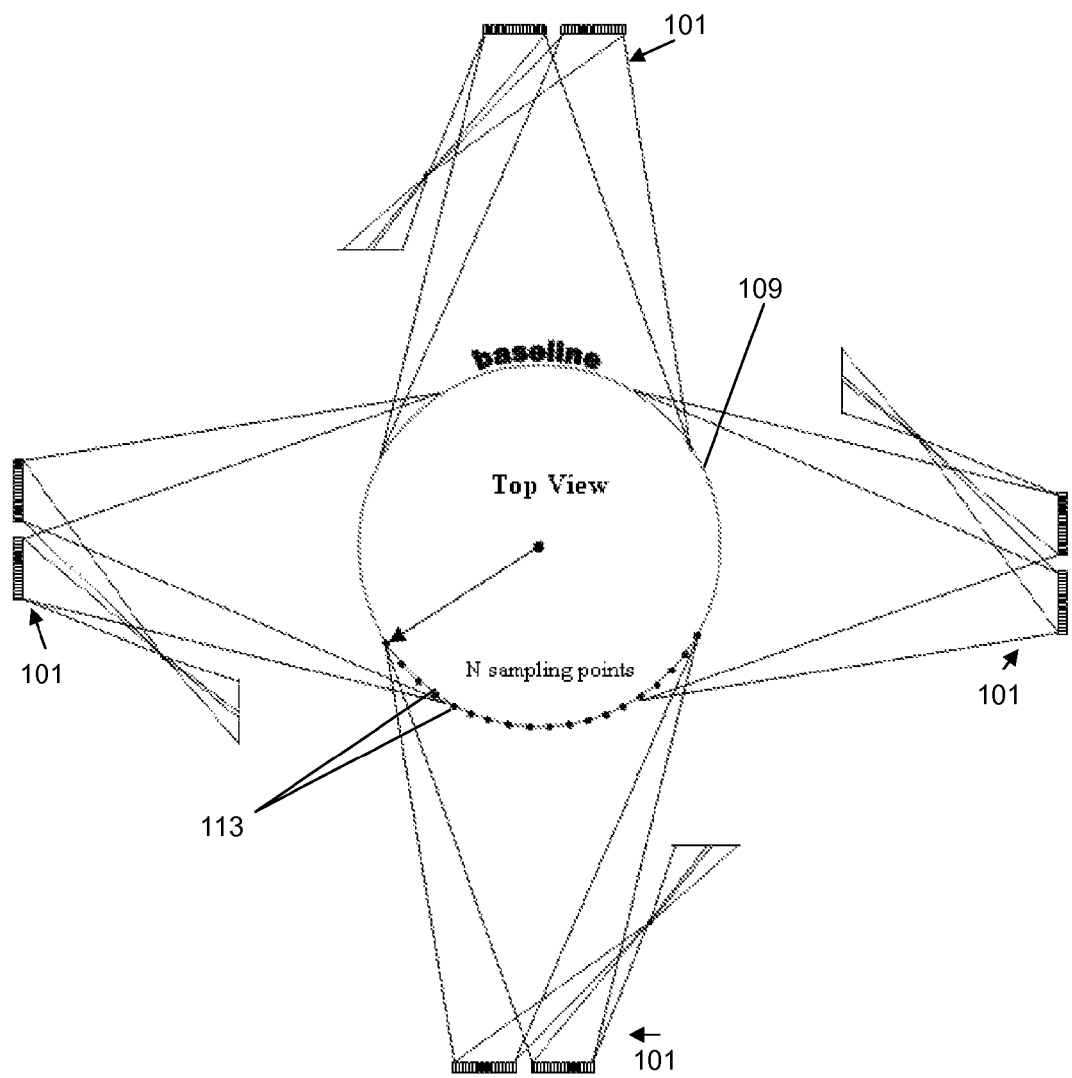
FIG. 9 illustrates four 3D-imaging apparatus of FIG. 1 arranged to capture an "all-round" perspective of the object.

FIG. 9 illustrates four instances of the 3D-imaging apparatus 101 arranged to capture an "all-round" multiple-perspective views of an object. Adjacent instances of the 3D-imaging apparatus 101 are arranged around the centre of the baseline 109 at offsets of 90 degrees in order to capture an all-round multiple-perspective view of the object. The same concepts, as have been described above, apply for reconstructing the all-round 3D model of the object.

Method of Generating a 3D Image of an Object

Figure 10:
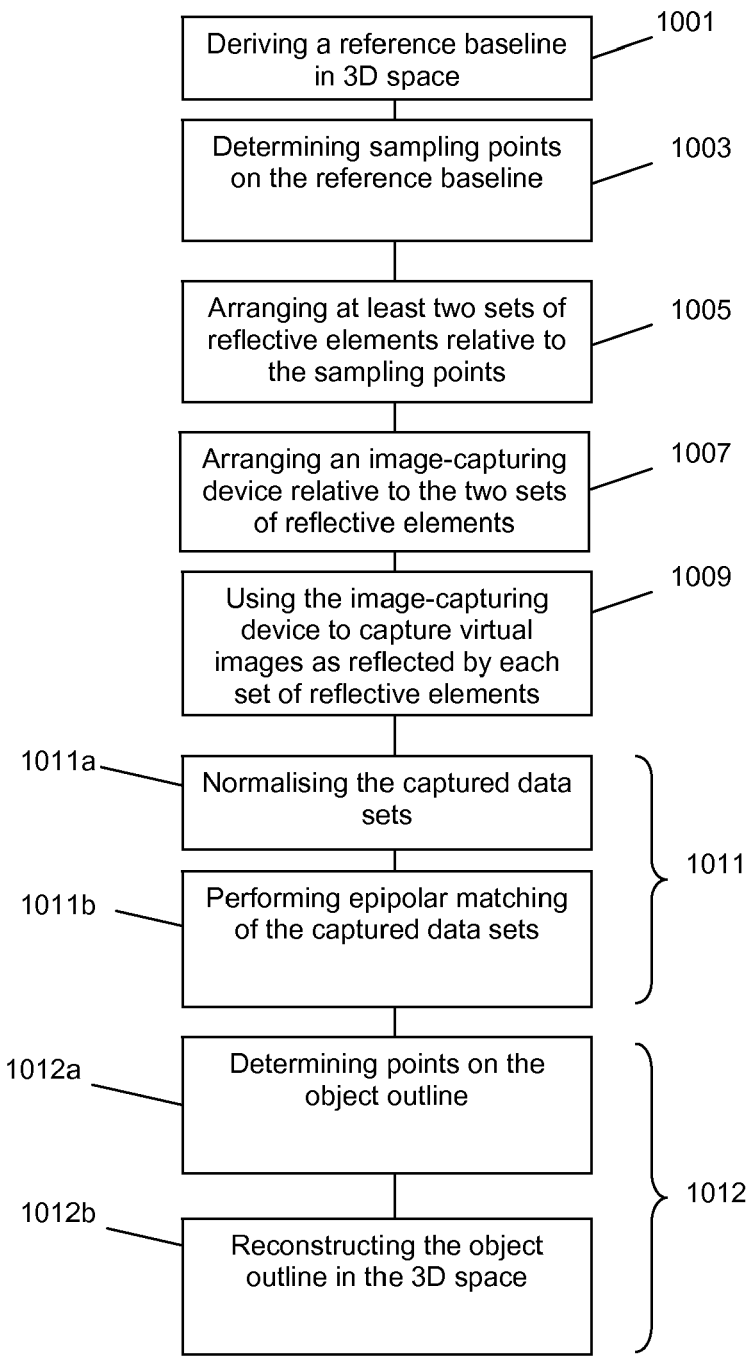
FIG. 10 is a flow chart showing the steps of generating a 3D image of an object.

FIG. 10 is a flow chart showing a method of generating a 3D image of an object, which comprises the steps of:
(i) deriving 1001 a reference baseline in 3D space based on an object outline;
(ii) determining 1003 a plurality of sampling points on the reference baseline;
(iii) arranging 1005 at least two sets of reflective elements relative to the plurality of sampling points;
(ii) arranging 1007 an image-capturing device relative to the at least two sets of reflective elements;
(iii) using 1009 the image-capturing device to capture virtual images (or data sets) of the object as reflected by each set of reflective elements;
(iv) locating 1011 a plurality of pairs of matching points in the respective virtual images captured, each pair of the matching points being for determining the location of a corresponding element of the object; and
(v) using 1012 the determined locations of the object to generate a 3D image of the object.

Specifically, the step of locating 1011 the plurality of pairs of matching points in the respective virtual images comprises the steps of:
(a) normalising 1011a the captured data sets; and (b) performing 1011b epipolar matching of the captured data sets.

Also, the step of using 1012 the plurality of determined locations of the object comprises the steps of:

(c) determining 1012a various points on the object outline; and
(d) reconstructing 1012b the object outline in the 3D space based on the determined points.

Further, the method may comprise the further step of reconstructing a 3D model of the object based on different object outlines determined by the steps above.

Variations of the 3D-Imaging Apparatus

It should be appreciated that many variations of the 3D-imaging apparatus can be envisaged without departing from the scope and spirit of the claimed invention.

Figures 11A, 11B:
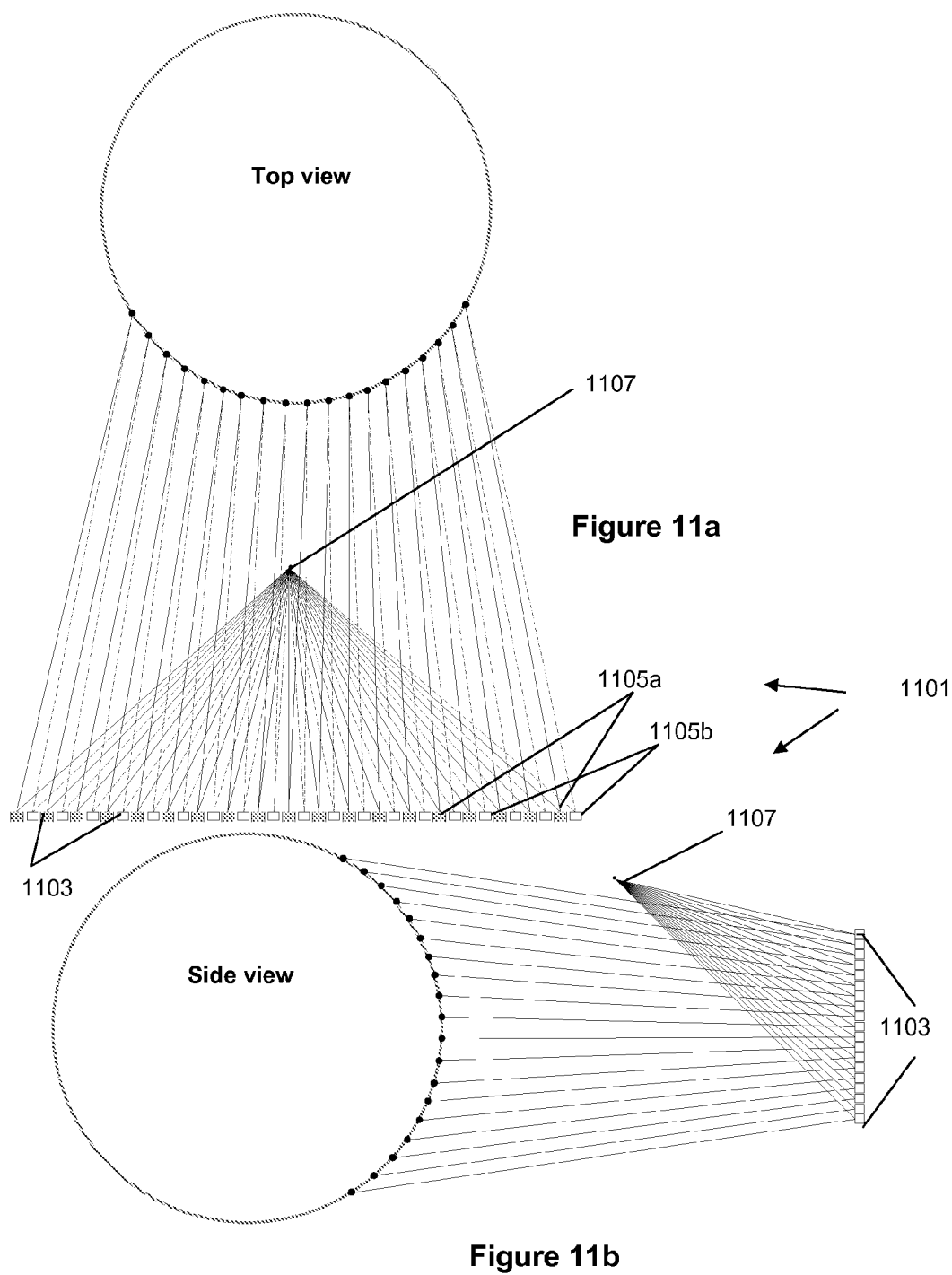
FIGS. 11a and 11b illustrate a top and a side view of another embodiment of the 3D-imaging apparatus.

For example, FIGS. 11a and 11b show respective top and side views of another embodiment of the 3D-imaging apparatus 1101, whereby holographic optical elements 1103 of the two different sets 1105a, 1105b are interleaved. Also the charge-coupled device 1107 is arranged above the holographic optical elements 1103, instead of at an offset distance from the rightmost HOE as is the case shown in FIG. 1. This arrangement may provide a compact structure of the 3D-imaging apparatus 1101.

Figure 12:
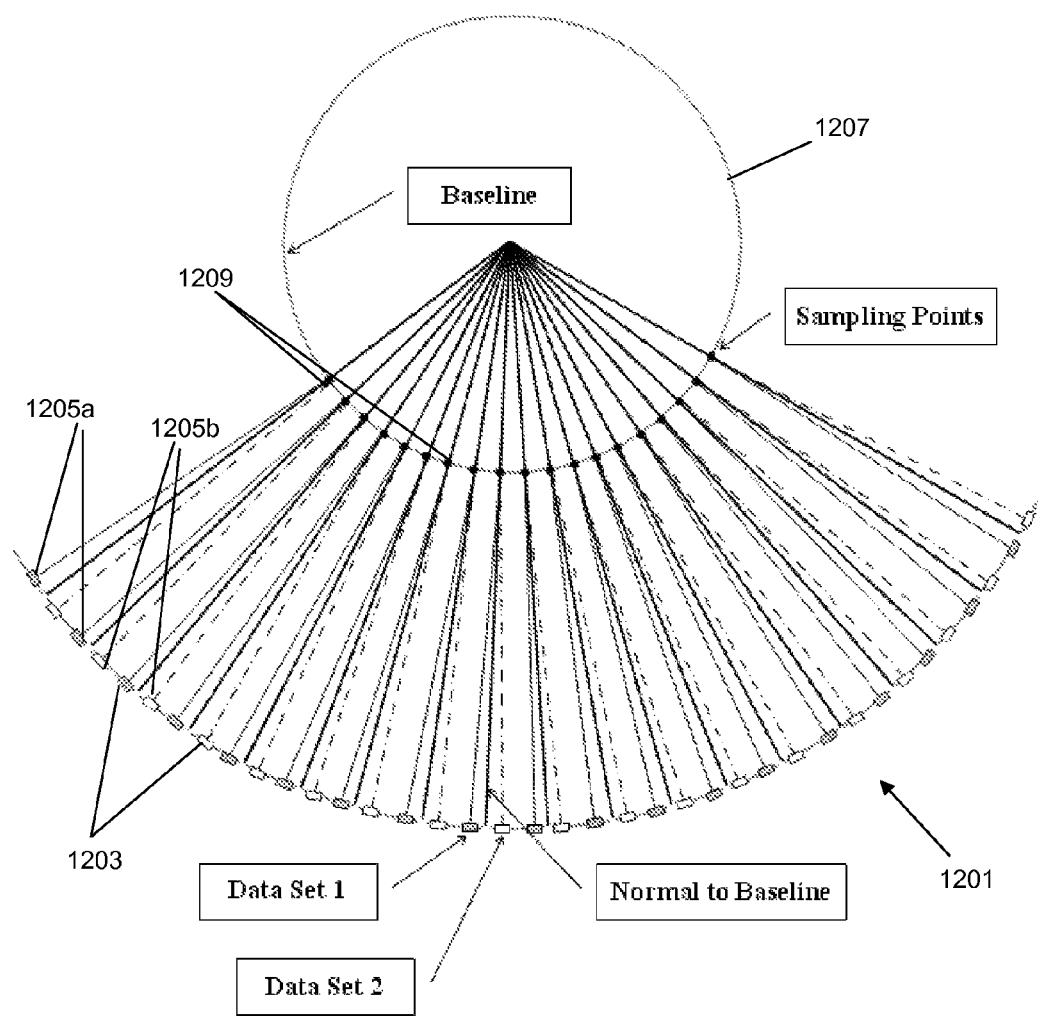
FIG. 12 illustrates a further embodiment of the 3D-imaging apparatus.

Furthermore, FIG. 12 shows a further embodiment of the 3D-imaging apparatus 1201. Like the 3D-imaging apparatus 1101 shown in FIG. 11, holographic optical elements 1203 from the two different sets 1205a, 1205b are also interleaved. Unlike the 3D-imaging apparatus 1101 of FIG. 11, however, the sets 1205a, 1205b of the holographic optical elements 1203 are arranged not on a common plane but on a common cylindrical surface coaxial with the cylindrical baseline 1207. Due to the parallel arrangement of the holographic optical elements 1203 relative to the cylindrical baseline 1207, rays emanate from the sampling points 1209 to the holographic optical elements 1203 at an angle normal to that cylindrical baseline 1207. Advantageously, this may reduce the problem of occlusion. Note that in this embodiment the charged coupled device (not shown in FIG. 12) can be placed at the centre of the cylindrical baseline 1207, if that location is not occupied by the object to be imaged. In this case, the arrangement of the data sets is symmetrical. In symmetrical embodiments, the normalisation step is not necessary since the pair of rays emitted from each point of the object to be imaged travel the same distance to the charge coupled device.

Figure 13A:
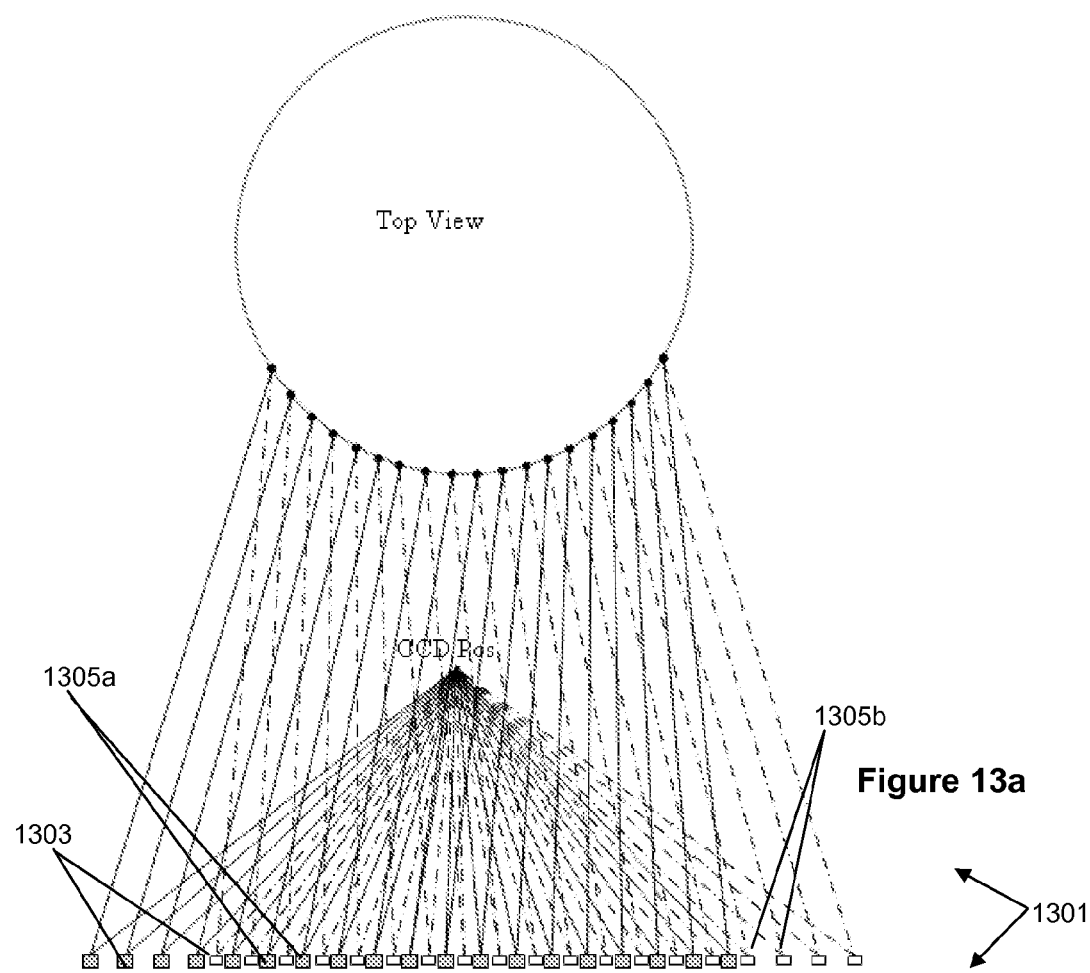
FIGS. 13a and 13b illustrate a top and a side view of yet another embodiment of the 3D-imaging apparatus.
Figure 13B:
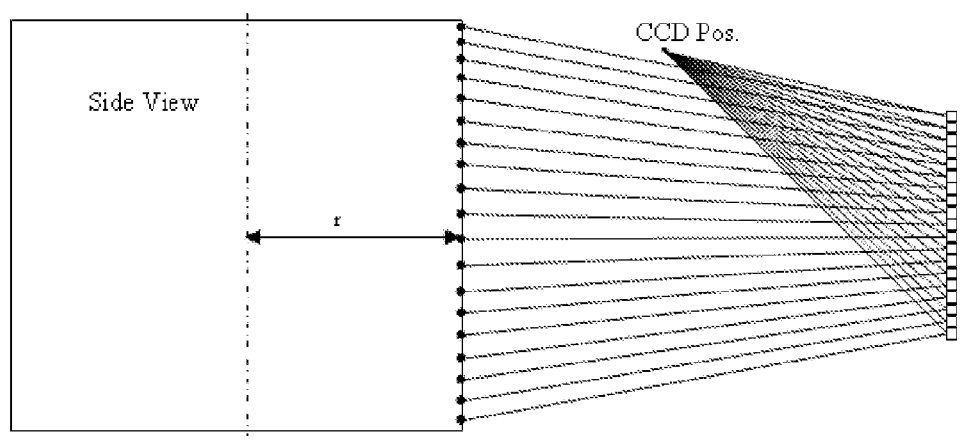

FIGS. 13a and 13b illustrate the top and side view of yet another embodiment of the 3D-imaging apparatus 1301. Like the embodiments of the 3D-imaging apparatus 1101, 1201, holographic optical elements 1303 of the 3D-imaging apparatus 1301 of the two different sets 1305a, 1305b are again interleaved. However, each of the holographic optical elements 1303 from the set 1305b is laterally offset at a distance towards the right compared to its corresponding optical element 1303 from the set 1305a, and this distance is greater than the spacing between neighbouring optical elements 1303 in either of the sets 1305a, 1305b.

Other variations of the 3D-imaging apparatus are also possible. For example, reference baselines of different geometries may also be used so long as they roughly resemble the object outlines in the 3D space.

Moreover, since the accuracy of the reconstructed object outlines and/or the 3D models depends on the number of reflective elements in each set, there may be tens of reflective elements in each set, or it may be in the range of hundred or even thousands.

The charge-coupled device 107 may be a pin-hole camera. Alternatively, the charge-coupled device 107 may be a digital single-lens reflect (DSLR) camera.

Figure 14A:
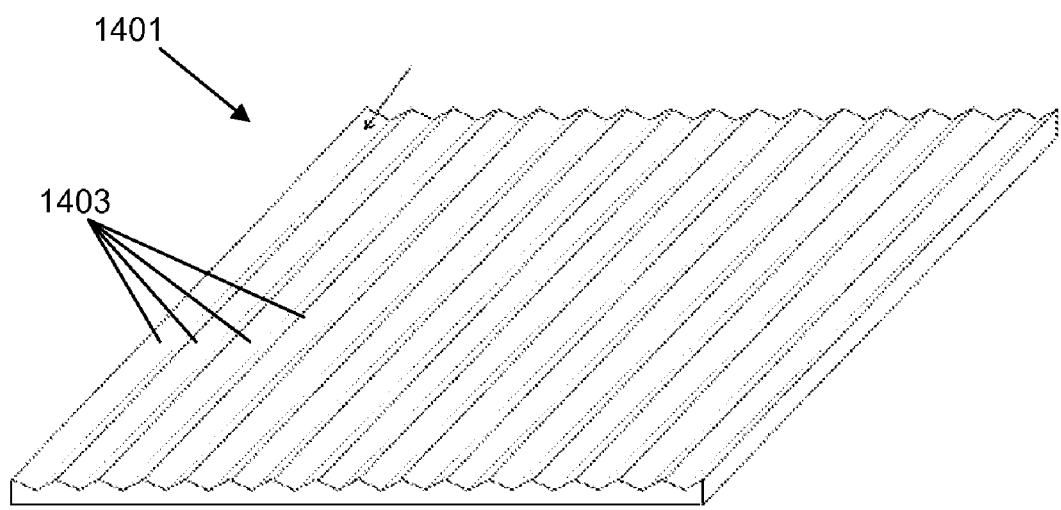
FIG. 14a illustrates a perspective view of a machined block used in place of the holographic optical elements.
Figure 14B:
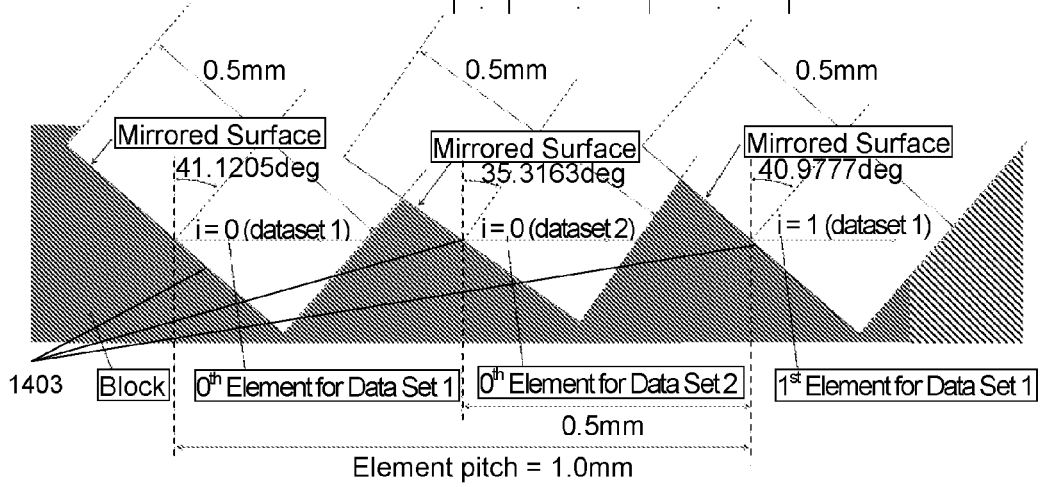

Furthermore, the reflective elements may be formed by applying precision machining on a solid block. FIG. 14a illustrates a perspective view of a solid block 1401 on which precision machining has been applied. Note that the number of machined surfaces 1403 has been reduced to simplify illustration. Each machined surface 1403 of the solid block 1401 has a unique tilt angle and a mirror for reflecting different perspective view of an object. FIG. 14b illustrates a cross-section B-B' of the solid block 1401 shown in FIG. 14a. It can be seen that two sets of reflective elements are interleaved in FIG. 14b, with the leftmost machined surface 1403 corresponding to the first reflective element 105 (i.e. i=1) of the array 103a; the second leftmost machined surface 1403 corresponding to the first reflective element 105 (i.e. i=1) of the array 103b; the third leftmost machined surface 1403 corresponding to the second reflective element 105 (i.e. i=2) of the array 103a, and so forth. The element pitch (i.e. the separation distance) between the corresponding reflective elements 105 of the arrays 103a, 103b is 0.5 mm, whilst the element pitch between successive reflective elements 105 of each array 103a, 103b is 1 mm.

Since the angular accuracy of each reflective element is important, the accuracy (i.e. tolerance specifications) of the precision machine should be evaluated to ensure the precision machine meets the requirements.

For example, computer-mechanical-control (CNC) machines and profile grinders are some options that may meet these requirements. For CNC machining, mirror-coating may be necessary for the machined surfaces to reflect the various perspective views of an object. For profile grinders, the ground surfaces may however be sufficiently smooth to reflect the various perspective views of an object such that the additional mirror-coating is typically not required.

Although the holographic optical elements may offer a lot of flexibility in terms of design and implementation which precision machining of the solid block may not offer, the use of a machined block in place of the holographic optical elements may offer a more practical implementation compared to the use of the holographic optical elements. This is because so long as the accuracy of the precision machining is guaranteed by the precision machine, the accuracy of tilt angles of respective machined surfaces of the solid block may be ensured. With the holographic optical elements, however, issues like the diffraction efficiency of the polymer being less than unity and the three colours (i.e. red, green and blue) not being convergent to a common point would have to be addressed. Assuming these issues are sufficiently addressed, the use of the holographic optical elements is more preferred than the precision machining of the solid block.

The invention claimed is:

1. A three-dimensional imaging apparatus for generating an image of a three-dimensional object, the apparatus comprising:
   at least two sets of reflective elements;
   an image-capturing device operative to capture two images using rays emitted from the object and reflected from the respective sets of reflective elements; and
   a processor operative (i) to identify a plurality of sets of matching points in the respective captured images, each set of matching points having been generated by respective rays emitted by a single corresponding element of the object, and (ii) for each set of matching points in the respective captured images, to determine a location of the corresponding element of the object;

wherein,
the processor is operative to generate an image of the object using the determined locations of the plurality of elements of the object.

2. The three-dimensional imaging apparatus of claim 1, in which the processor is operative, prior to step (i), to normalise the images to compensate for different distances of the reflective elements from the image capturing device.

3. The three-dimensional imaging apparatus of claim 2 in which the processor is operative to perform the normalisation using a predetermined mapping between the sizes and shapes of the images which is associated with a reference baseline approximating the shape of the three-dimensional object.

4. The three-dimensional imaging apparatus of claim 3, in which the processor is operative to normalise the captured images by resizing columns of one of the captured images.

5. The three-dimensional imaging apparatus of claim 1, in which the processor is operative to identify the sets of matching points of the captured images by comparing an epipolar line in one of the captured images against a corresponding epipolar line in the other respective image.

6. The three-dimensional imaging apparatus of claim 1, in which the processor is operative to identify the sets of matching points in the captured images by comparing an epipolar line in one of the captured images against a plurality of epipolar lines in the other respective image.

7. The three-dimensional imaging apparatus of claim 1, wherein the two sets of reflective elements are arranged on a common plane.

8. The three-dimensional imaging apparatus of claim 3, wherein the two sets of reflective elements are arranged on a common surface parallel to the reference baseline.

9. The three-dimensional imaging apparatus of claim 1, wherein the two sets of reflective elements are interleaved.

10. The three-dimensional imaging apparatus of claim 1, wherein each of the two sets of reflective elements comprise a plurality of holographic optical elements.

11. A method of generating a three-dimensional image of an object, the method comprising the steps of:

arranging two sets of reflective elements relative to the object;
arranging an image-capturing device relative to the two sets of reflective elements;
using the image-capturing device to capture an image reflected from each of the two sets of reflective elements;
locating a plurality of sets of matching points in the respective captured images, each set of matching points having been generated by rays emitted by a single corresponding element of the object;
using each set of the matching points in the respective captured images, to determine a location of the corresponding element of the object; and
generating an image of the object using the determined locations of a plurality of elements of the object.

12. The method of claim 11, further comprising:
deriving a reference baseline approximating the shape of the object; and
employing the reference baseline to normalise the captured images before locating the plurality of matching points.

13. The method of claim 12, wherein the normalising of the captured images comprises resizing columns of one of the captured images.

14. The method of claim 11, wherein the locating of the plurality of matching points comprises comparing an epipolar line in one of the captured images against a corresponding epipolar line in the other respective image.

15. The method of claim 11, wherein the locating of the plurality of matching points comprises comparing an epipolar line in the one of the captured images against a plurality of corresponding epipolar lines in the other respective image.

16. The method of claim 11, wherein the two sets of reflective elements are arranged on a common plane.

17. The method of claim 12, wherein the two sets of reflective elements are arranged on a common surface parallel to the reference baseline.

18. The method of claim 13, wherein the two sets of reflective elements are interleaved.

* * * * *